US008515086B2

(12) United States Patent
Marton et al.

(10) Patent No.: US 8,515,086 B2
(45) Date of Patent: Aug. 20, 2013

(54) METHOD AND SYSTEM FOR CLOCK DRIFT COMPENSATION

(76) Inventors: Trygve Frederik Marton, Oslo (NO);
Torgeir Grothe Lien, Oslo (NO)

(*) Notice: Subject to any disclaimer, the term of this patent is extended or adjusted under 35 U.S.C. 154(b) by 537 days.

(21) Appl. No.: 12/338,719

(22) Filed: Dec. 18, 2008

(65) Prior Publication Data

US 2009/0185695 A1 Jul. 23, 2009

Related U.S. Application Data

(60) Provisional application No. 61/014,636, filed on Dec. 18, 2007.

(51) Int. Cl.
*H04B 3/20* (2006.01)
*A61F 11/06* (2006.01)
*H04M 9/08* (2006.01)

(52) U.S. Cl.
USPC ............... 381/66; 381/71.12; 379/406.02; 379/406.14

(58) Field of Classification Search
USPC ............ 381/66, 71.1, 71.12; 379/158, 93.21, 379/202.01, 406.01–406.16; 370/286, 289
See application file for complete search history.

(56) References Cited

U.S. PATENT DOCUMENTS

| 6,754,295 B1 * | 6/2004 | Hartnett ........................ 375/356 |
| 7,120,259 B1 | 10/2006 | Ballantyne et al. |
| 7,555,116 B1 | 6/2009 | Le Tourneur et al. |
| 2003/0081804 A1 * | 5/2003 | Kates ............................ 381/316 |
| 2003/0149495 A1 | 8/2003 | Hodges |
| 2007/0047738 A1 * | 3/2007 | Ballantyne et al. ............. 381/66 |
| 2007/0165837 A1 * | 7/2007 | Zhong et al. ............. 379/406.01 |
| 2007/0165838 A1 * | 7/2007 | Li et al. ..................... 379/406.01 |

FOREIGN PATENT DOCUMENTS

| EP | 1 853 087 A1 | 11/2007 |
| WO | WO 01/45375 A1 | 6/2001 |
| WO | WO 2005/096123 A2 | 10/2005 |
| WO | WO 2006/071119 A1 | 7/2006 |
| WO | WO 2007/005206 A2 | 1/2007 |

OTHER PUBLICATIONS

Extended European Search Report issued Apr. 1, 2011, in Patent Application No. 08862488.7.

(Continued)

*Primary Examiner* — Matthew Landau
*Assistant Examiner* — Khaja Ahmad
(74) *Attorney, Agent, or Firm* — Oblon, Spivak, McClelland, Maier & Neustadt, L.L.P.

(57) ABSTRACT

Different sampling rates between a playout unit and a capture unit are compensated for via a system, method and computer program product. The playout unit receives samples from a computational unit, and the capture unit sends samples to the computational unit. A playout FIFO buffer operates in a playout time domain, and a capture FIFO buffer operates in a capture time domain. The computational unit is synchronized to a common clock. A first relationship is calculated between the common clock and a playout fifo buffer read pointer, and a second relationship is calculated between the common clock and a capture FIFO buffer write pointer. For each sample in the playout time domain a corresponding sample in the samples from said computational unit is found and sent to the playout FIFO buffer. For each sample in the common clock time domain the corresponding sample in the capture time domain is found and sent to the computational unit.

35 Claims, 9 Drawing Sheets

(56) References Cited

OTHER PUBLICATIONS

Alper Erdogan, et al., "Efficient Implementation of Echo Canceller for Applications With Asymmetric Rates", In: Proceedings (ICASSP '03) of the 2003 IEEE International Conference on Acoustics, Speech, and Signal Processing, vol. 6, Apr. 6-10, 2003, pp. VI-233-VI-236.

Office Action issued Nov. 8, 2012 in Japanese Patent Application No. 2010-539341 (English translation only).

Office Action issued Dec. 11, 2012 in Chinese Application No. 200880114273.1 (With English Translation).

* cited by examiner

METHOD AND SYSTEM FOR CLOCK DRIFT COMPENSATION

CROSS REFERENCE TO RELATED APPLICATIONS

This application claims the benefit of U.S. Provisional Application No. 61/014,636, filed Dec. 18, 2007, the entire contents of which being incorporated here by reference.

BACKGROUND OF THE INVENTION

1. Field of the Invention

The present invention relates to clock drift compensation, and in particular clock drift compensation methods, apparatuses and computer program product for echo cancellers implemented on computer based systems.

2. Discussion of the Background

In a conventional conferencing system or any hands free (e.g. not a handheld telephone held to a person's ear) system, one or more microphones capture a sound wave at a site A, and transforms the sound wave into a first audio signal (i.e., an electric signal that conveys the audio content). The first audio signal is transmitted to a site B, where a television set, or an amplifier and loudspeaker, reproduces the original sound wave by converting the first audio signal generated at site A into the sound wave, which is audible to the human ear.

FIG. 1 illustrates a typical echo problem in a hands free communication systems. A digital audio signal 1101 from a far end (site A) is converted from the acoustic domain into the analog electronic domain by the digital to analog converter (DAC) 1301, amplified in the loudspeaker amplifier 1302 and then converted to acoustic signals by the loudspeaker 1303. Both the direct acoustic signal 1304 and reflected versions 1306, reflected by walls/ceilings etc. 1305 are undesirable picked up by the microphone 1308. The microphone also picks up the desired near end signal 1307 (e.g. person's voice in the same room as microphone 1308). The microphone signal is amplified in the microphone amplifier 1309 and digitized by the analog to digital converter 1310, outputting an uncancelled microphone signal 1202.

If the uncancelled microphone signal 1202 were transmitted to the far end, the participants at the far end site would hear an echo(s) of themselves, and if a similar system were present at the far end, even howling/feedback might occur.

To deal with this problem, it has been proposed to add an acoustic echo canceller 1203 to the digital microphone signal path. This canceller 1203 uses the digital loudspeaker signal 1101 as a signal reference 1201, and estimates all of the loudspeaker to microphone paths 1304/1306, and subtracts these estimates from the uncancelled microphone signal 1202, making the cancelled microphone signal 1204, which is transmitted to the far end, as signal 1102.

Two main approaches are widely used for acoustic echo cancellers today: a full band canceller and a sub band canceller. Both of these approaches normally use adaptive FIR (finite impulse response) filters for the echo path estimating, however applying these in full band domains and sub band domains, respectively.

An acoustic echo canceller used in a product will typically include several further sub blocks not shown in the figures in this document; a double talk algorithm, a non-linear processing unit, comfort noise generation, etc. For simplicity, these sub blocks are omitted. These blocks may vary and also are well documented in papers, patents and literature. For a person skilled to the acoustic processing art, integrating of these blocks in a signal processing stream is straightforward.

FIG. 2 illustrates features of a basic full band acoustic echo canceller.

The digital signal from far end 2101 is passed to the loudspeaker as signal 2102 and is also used as the loudspeaker reference signal 2103.

The loudspeaker reference signal 2103 is filtered through the adaptive FIR filter 2104. This adaptive filter converges to and tracks the impulse response of the room in which the microphone is located. For the initial convergence, and for any acoustic changes in the room (door opens, people move, etc.), the adaptive FIR filter 2104 has to adapt. Many different adaptive algorithms can be used for this purpose, from the inexpensive (low processing power) least mean square (LMS) to more sophisticated and more resource demanding algorithms as affine projection algorithm (APA) and recursive least squares (RLS). However, in common, all these algorithms use the FIR filter update loop 2108 for adapting.

The adaptive FIR filter outputs an inverted echo estimate 2105, which is added to the uncancelled microphone signal 2106, calculating the echo cancelled microphone signal 2107.

The other approach uses subband processing. FIG. 3 illustrates this approach.

The digital signal from the far end 3101 is passed to the loudspeaker as signal 3102. It is also divided into a chosen number of subbands using the analyze filter 3301.

The uncancelled microphone signal 3106 is divided into subbands using another (but equal) analyze filter 3302.

For each subband, the loudspeaker analyze filter 3301 outputs a subband reference signal 3203, which is filtered through a subband FIR filter 3204, calculating an inverted subband echo estimate 3205. The microphone analyze filter 3302 outputs a subband uncancelled signal 3206, which is added to the inverted echo estimate, outputting a subband echo cancelled microphone signal 3207. The echo cancelled microphone signal is used for the adapting of the FIR filter, shown as the subband FIR filter update loop 3208.

The echo cancelled microphone signals from all subbands are also merged together to a fullband cancelled microphone signal 3107 by the synthesize filter 3303.

Both the fullband and subband echo cancellers estimates the response from output digital samples (2102/3102) to input digital samples (2106/3106). This response is affected by any software or hardware that the signal passes through, including but not limited to sampling rate converters, mixers, the D/A converter, the loudspeaker, the acoustic coupling, the microphone and the A/D converter. It is inherent in the design that the rate of samples in the input signal 2106/3106 equals the rate of samples in the output signal 2102/3102. For best performance, the response (including the delay) of controllable parts should be kept constant.

In well designed systems, the equal sampling rate is ensured by using the same clock source for the D/A and A/D converters, whereas constant (or at least predictable) delay is maintained by proper hardware and software design.

However, in some designs, as recognized by the present inventors, different clock sources are used for the A/D and the D/A converter. This is, for example, the case in personal computers (PCs), where the A/D converter and D/A converter can be placed on different cards, with conversion clocks generated locally on each card respectively. A typical, and widely used situation, is the case where audio is captured (A/D converted) by a Web-camera, while the audio is played out (D/A converted) by the PC's audio card.

Any difference in rates between the A/D converter and the D/A converter may cause several problems:

1. Frequency shift: There may be a frequency shift between the signals from the 2102/3102 signal to the 2106/3106 signal. The linear echo canceller is not designed for such a shift, and thus the maximum obtainable instantaneous performance suffers.

2. Time drift: The time between the same samples in speaker signal 2102/3102 and the microphone signal 2106/3106 may change slowly, requiring the echo canceller to constantly readapt. The echo canceller can only readapt when the speaker signal 2102/3102 has adequately high power. Therefore, although the time delay changes slowly, the effective time shift in response after a period of silence (low 2102/3102 power) can be sufficiently big to result in considerable residual echo.

3. Overproduction/underproduction of samples: Since the production of samples for the A/D converter differs from the consummation from the D/A converter, there may be a congestion or lack of samples one or more places in the system.

Two types of drift may be present between the A/D conversion rate and D/A conversion rate. Both may be present at one time.

Drift occurs due to the clock source (crystal, oscillator, etc.) deviation from its nominal value. Crystals have varying levels of performance. Some of the parameters that can be specified for a crystal are frequency, stability, accuracy (in parts per million, or ppm), as well as limits on the variation in the above parameters due to temperature changes. In general, no two crystals are exactly the same. They will oscillate at slightly different frequencies, and their other characteristics will differ as well. This means that if the A/D and D/A converters are driven by clock signals derived from different crystals, there will be a slight difference in the rate at which those converters will run, even when the crystals run at the same nominal frequency, and the dividers for the A/D and D/A match. In this case, the number of samples produced over time by the A/D will not match the number of samples consumed in the same period of time by the D/A. The longer this period of time during which the number of samples generated by the A/D is compared to the number of samples consumed by the D/A, the greater the difference in the number of samples processed by the A/D and D/A.

Drift can also occur due to incompatible sample rates. When a capture/playout device does not support the sample rate of the audio stream, a software sample rate converter is inserted by the operating system. However, this sample rate converter may have a limited resolution, and thus the nominal sampling frequency will vary. The difference is constant over time, but can be considerably big. A typical value often experienced is 0.625%, i.e. 6250 ppm.

FIG. 4 illustrates a typical setup of a playout and capture system (4100 and 4200 respectively) in a PC. It should be noted that the exact setup varies with the chosen application programming interface (API) and with the audio playout/capture device driver. Often, to make systems work, double buffering or similar techniques are used. This is not shown in FIG. 4. The figure is made only to explain the main properties of the playout and capture system, as seen from the software application.

In the playout system 4100, the DAC (digital to analog converter) 4101 is clocked by the DACCLK 4102, i.e. the DAC 4101 processes samples with a rate dictated by DACCLK 4102. The DACCLK 4102 is usually derived from a much higher frequency of the crystal oscillator. The DAC 4101 processes one sample at a time from the DAC FIFO 4103. The DAC FIFO can be implemented both in hardware or software. When the DAC FIFO 4103 is empty, it retrieves $N_{playout}$ samples from the playout SRC (sample rate converter) 4104, which again takes a number of samples from the playout ring buffer 4112, which is part of the playout FIFO 4110. $N_{playout}$ can be as low as one, but larger numbers (groups of samples) are also common (e.g., $N_{playout}$=128 has been observed). Each situation varies depending on the make, model, software and components used in respective PC's. The playout read pointer 4113 is updated with the same number of samples taken from the ring buffer 4112 of the playout FIFO 4110. It is the software application's task to ensure that it fills the correct number of samples in the playout FIFO 4110, from the playout write pointer 4111. One exemplary software application is a software based echo cancellation application employed at an endpoint terminal used with a videoconference system. This software application may be preinstalled on the PC, distributed on a physical media, or downloaded over a network from a server.

Similarly, in the capture portion of the system, the ADC 4201 is clocked by the ADCCLK 4202, i.e. it produces samples with a rate of ADCCLK 4202. ADCCLK 4202 is usually derived from a much higher frequency provided by a crystal oscillator, but as stated before, not necessarily the same as the ADCCLK. The ADC delivers one sample at a time to the ADC FIFO 4203. The ADC FIFO can be implemented in hardware, or software, or a hybrid. When the ADC FIFO 4203 is full, it delivers $N_{capture}$ samples to the capture SRC (sample rate converter) 4204, which again delivers the calculated number of samples to the capture ring buffer 4212 (directly or indirectly), which is part of the capture FIFO 4210. $N_{capture}$ can be as low as one, but higher numbers are also common. The capture read pointer 4213 is updated with the same number of samples delivered to the capture ring buffer 4212 of the capture FIFO 4213. It is the software application's 4400 task to ensure that it processes the correct number of samples from the capture FIFO 4210, read from the capture read pointer 4211.

The software application 4400 transmits and receives samples to/from the playout and capture FIFOs, respectively.

For applications reading/writing audio data to a file or other unclocked sources, it is usually simple to produce consume the correct number of samples to/from the playout/capture FIFO. Even for simplex applications getting/delivering audio data from/to another clocked source/sink, correcting the number of samples delivered/processed to/from the playout/capture FIFO is usually rather straightforward, by either inserting or removing one or more samples. Such insertions or removals can be performed without audible degradations, and techniques for this are well known. As these techniques either insert or remove samples, there will be time delay changes, but in most applications this is acceptable.

However, as recognized by the present inventors for applications where an exact relationship between the samples delivered and the samples processed by the software application is critical, another solution must be found. This is the case for echo canceling. It should be pointed out that there are also other applications with this demand, for instance measuring applications, etc.

SUMMARY OF THE INVENTION

Consequently, at least one aspect of the present invention is to provide a device and method that solves at least one of the above-mention problems with conventional systems.

BRIEF DESCRIPTION OF THE DRAWINGS

In order to make the invention more readily understandable, the discussion that follows will refer to the accompanying drawings.

DETAILED DESCRIPTION

In the following, aspects of the present invention will be discussed by describing example embodiments, and by referring to the accompanying drawings. However, people skilled in the art based on the teachings herein will realize other applications and modifications within the scope of the invention as defined in the enclosed independent claims.

A common feature of the several embodiments is a clock drift compensator for computational units such as PCs, compensating for different sampling frequencies in analog to digital (A/D) and digital to analog (D/A) converters, e.g. in audio I/O devices connected to or included in the computational unit. The need for this compensation is due to the use of different circuit boards (e.g., audio board), that include different clock sources, which may not be, and usually are not, derived from a common source. As such, the clocks drift relative to each other and, unlike custom design circuitry, where it is possible to use a phase lock loop to lock the different clocks to one another, in a PC environment, software providers have limited access to the specific hardware used in the PC, as well as the drivers used with that particular hardware. As a consequence, in a PC setting, audio processing applications interface with audio package sent to the hardware, by way of the Microsoft API. Consequently direct measurement, and feedback loops at the hardware and driver level are not available for audio processing algorisms available from third parties.

Figure 1:
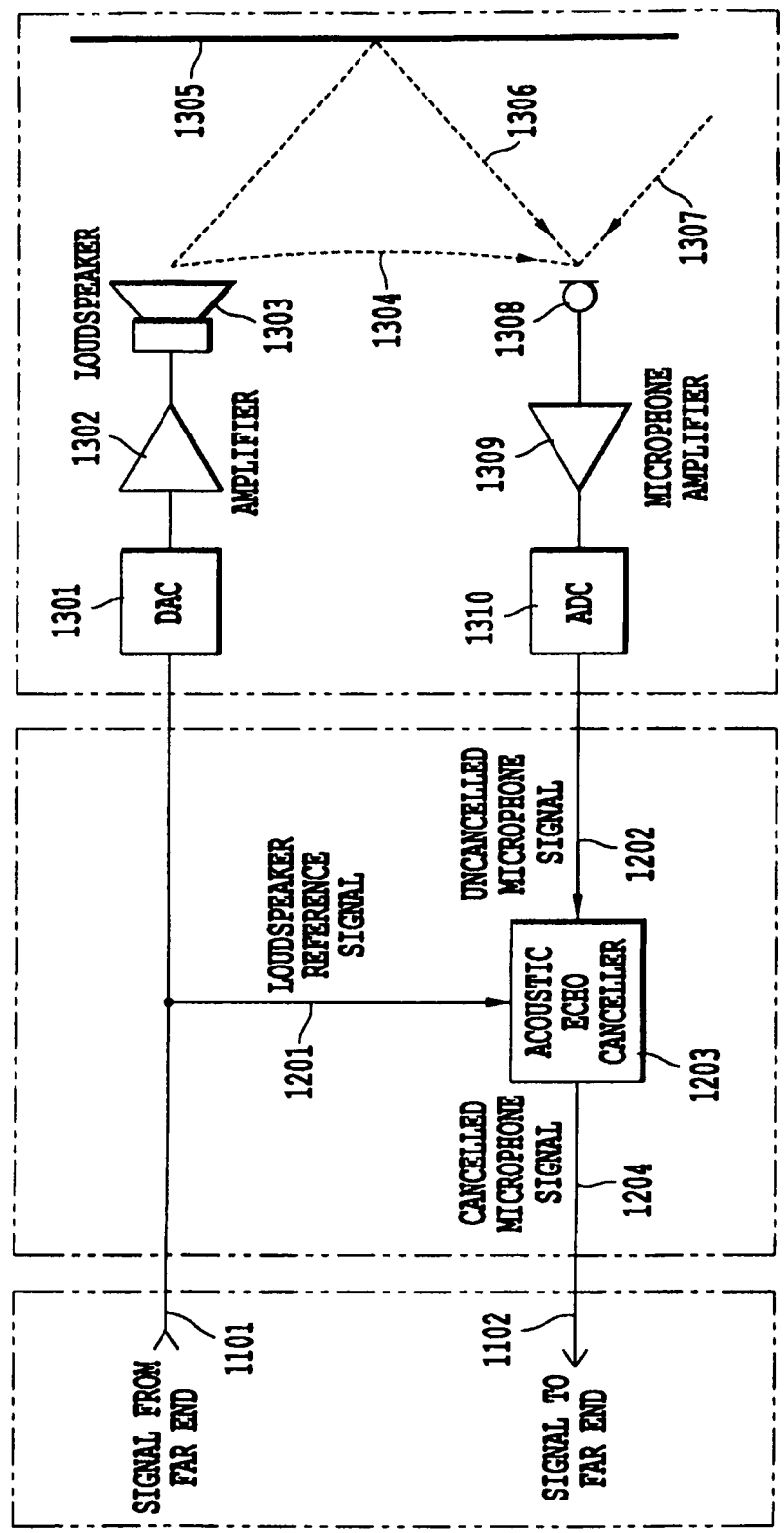
FIG. 1 is a black diagram that helps illustrate a typical echo problem in hands free communication systems.
Figure 2:
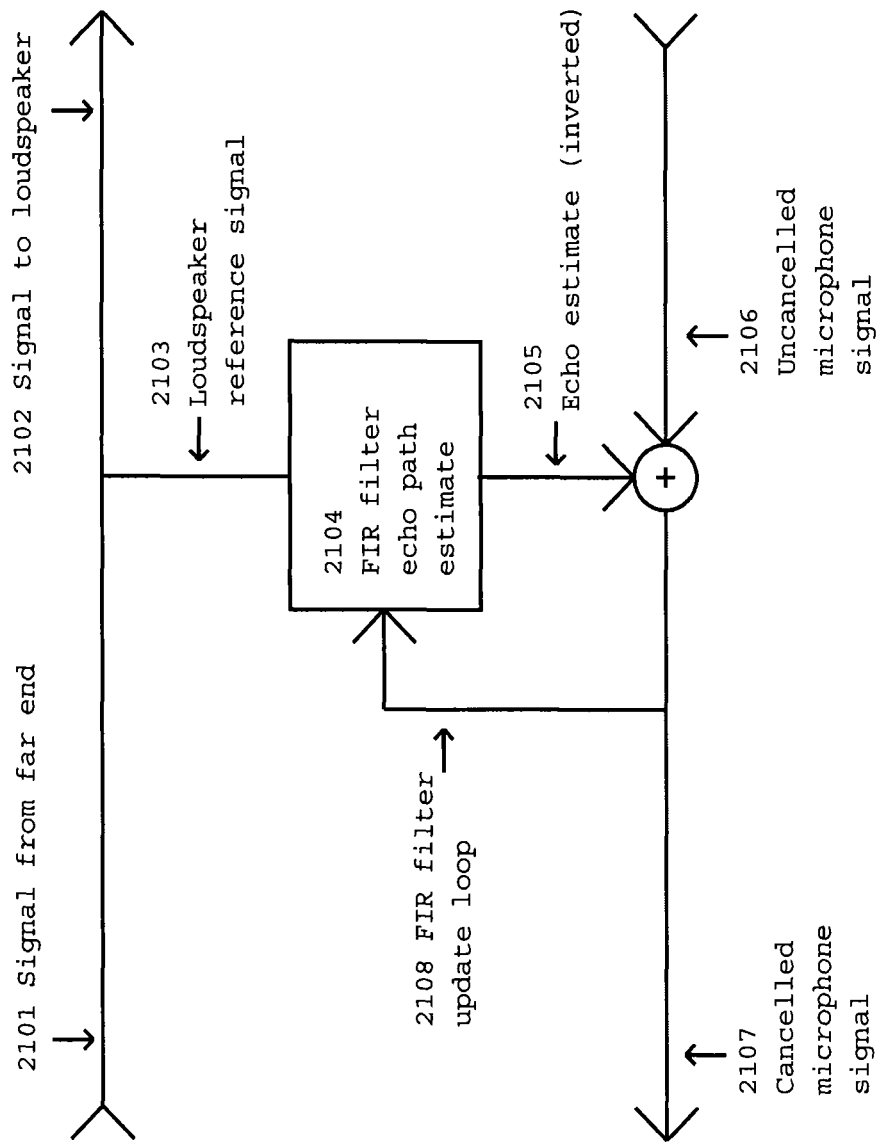
FIG. 2 is a schematic drawing of a basic full band acoustic echo canceller.
Figure 3:
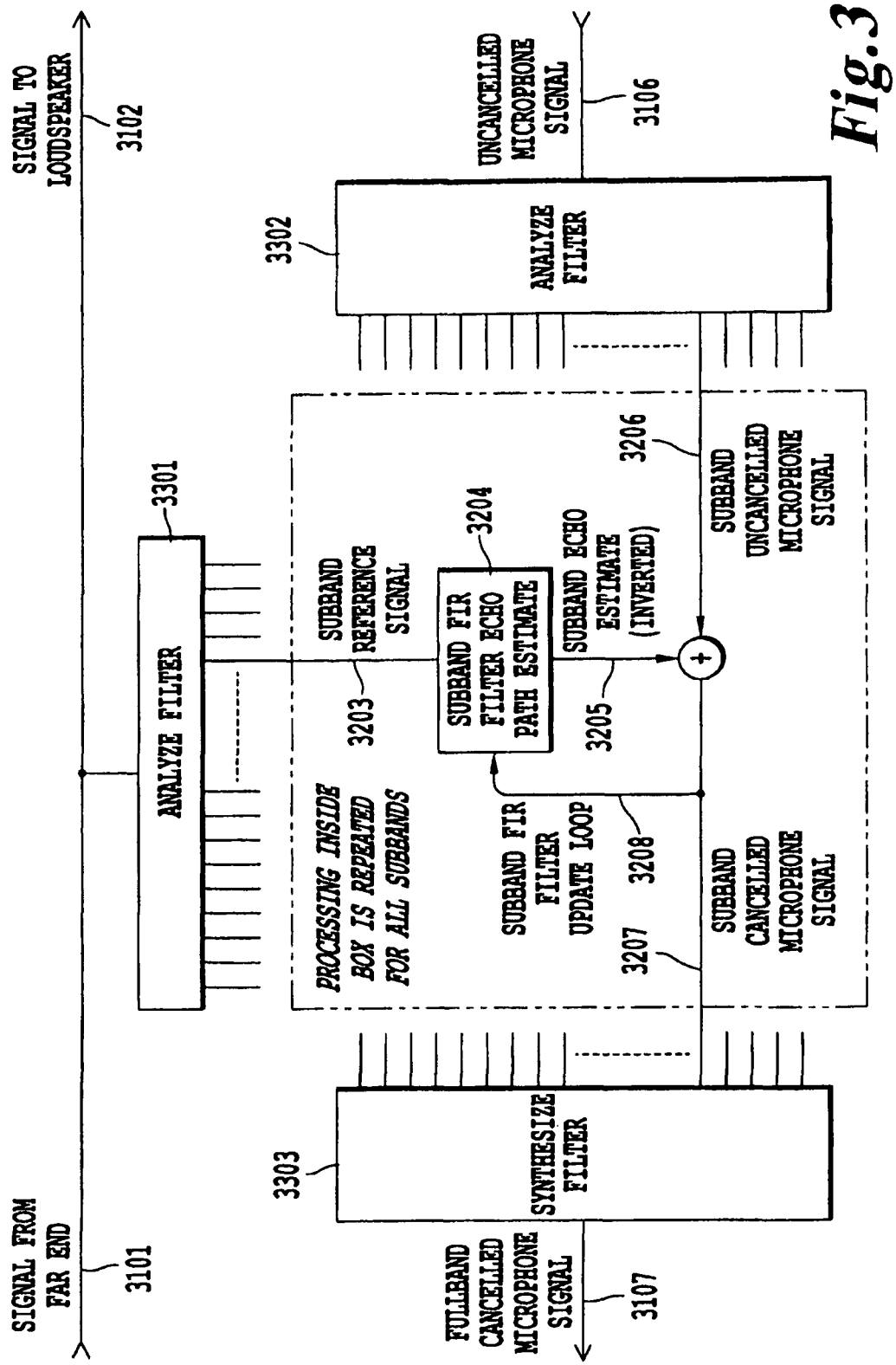
FIG. 3 is a schematic drawing of a basic sub band acoustic echo canceller.
Figure 4:
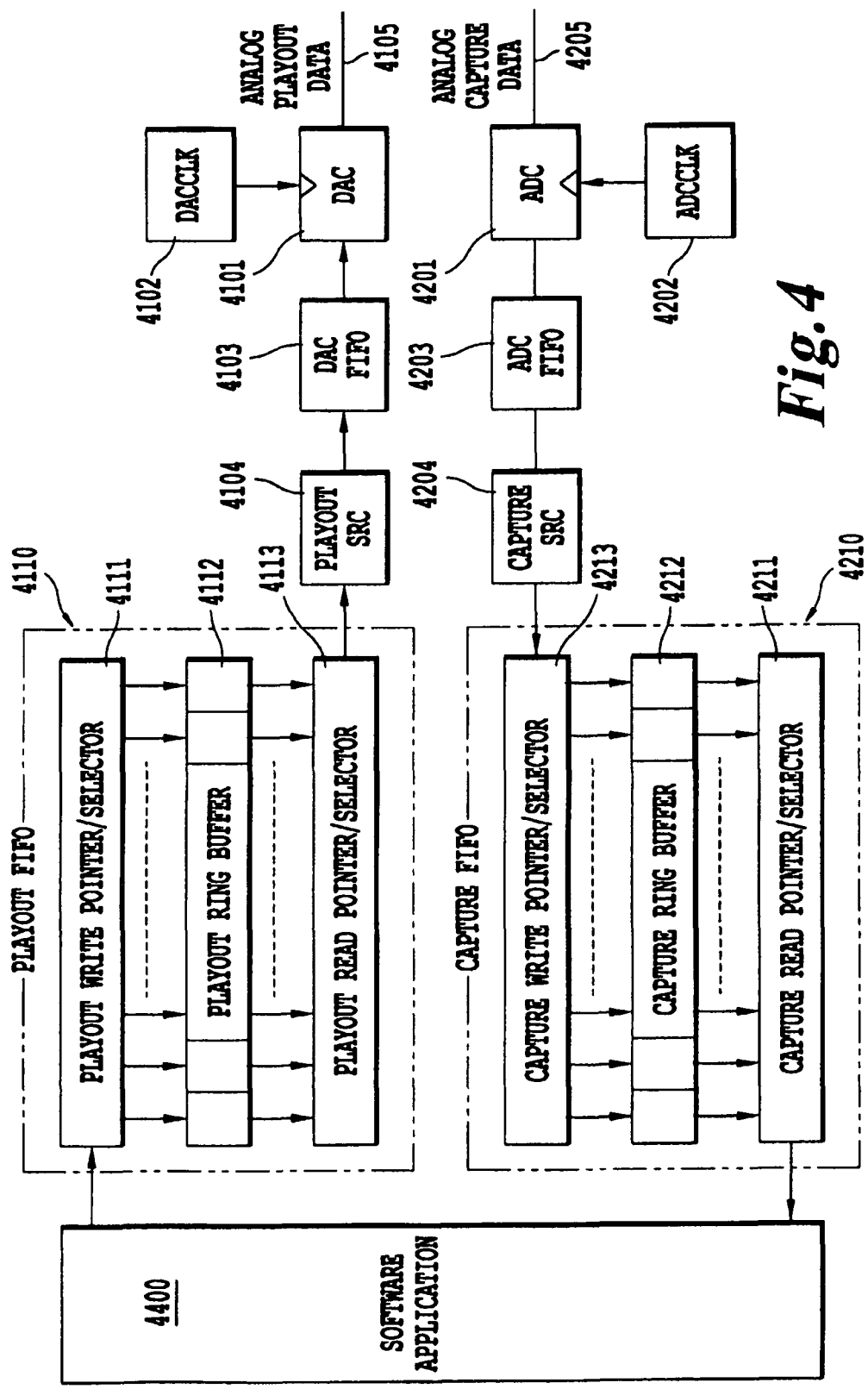
FIG. 4 illustrates a typical setup of the playout and capture portions of a PC.
Figure 5:
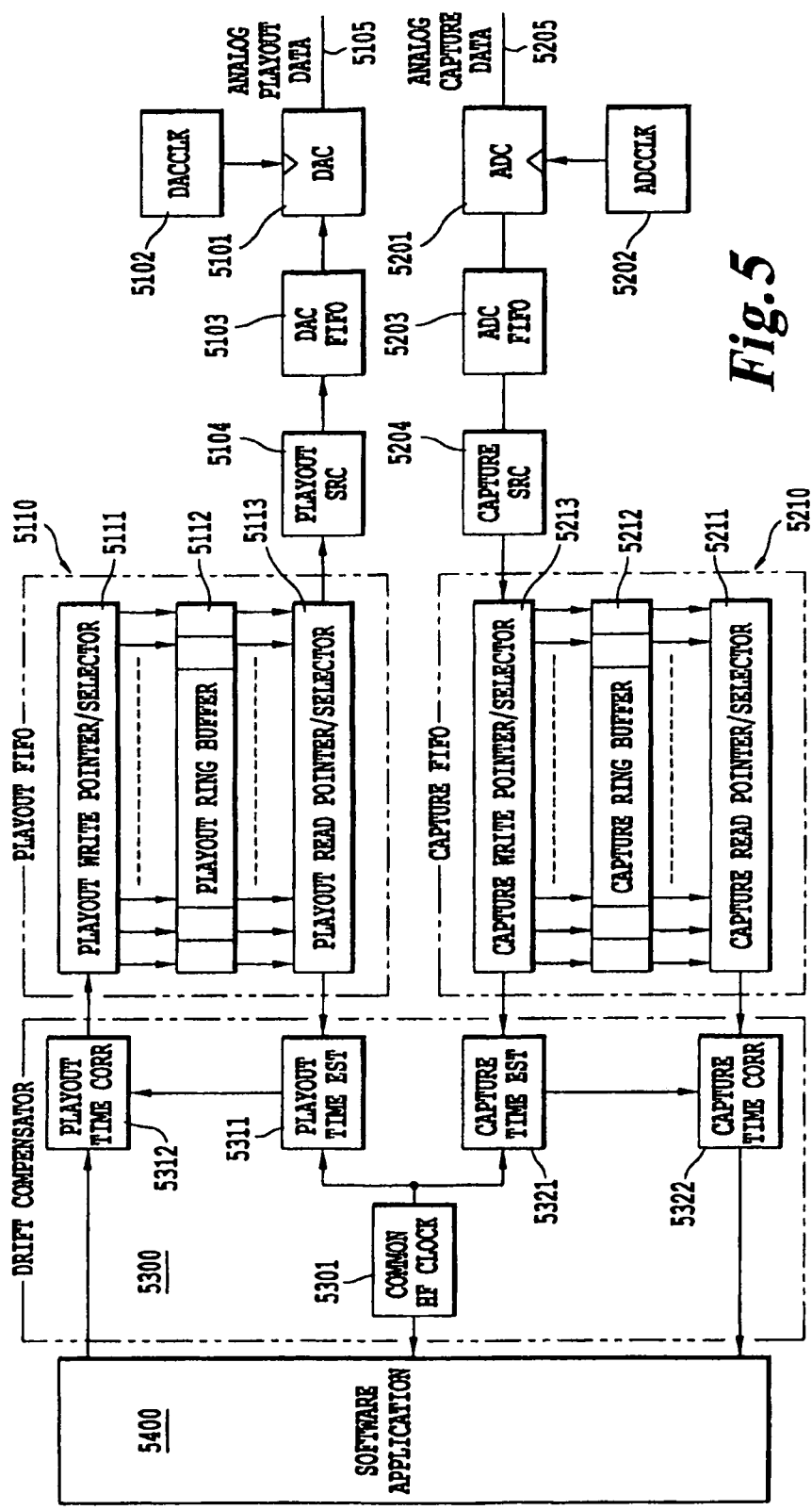
FIG. 5 illustrates a clock drift compensator according to one embodiment of the present invention.

As mentioned above, FIG. 4 illustrates a typical setup of the playout system 4100 and capture system 4200 in a PC. In FIG. 5, the setup in FIG. 4 is extended with a clock drift compensator 5300 in accordance with the principles of the present invention. The clock drift compensator 5300 is configured to compensate for different sampling frequencies in the playout and capture signal. The clock drift compensator 5300 includes a common high frequency (HF) clock 5301, a playout time device, or playout time estimator 5311, a playout time corrector 5312, a capture time device or capture time estimator 5321, and a capture time corrector 5322. The drift compensator 5300 can write data to the playout buffer 5110, which may be queue buffer, in particular a FIFO buffer such as a circular buffer or ring buffer, and read data from the capture buffer 5210, which may also be a queue buffer, in particular a FIFO buffer such as circular buffer or ring buffer. Further, the drift compensator 5300 sends and receives data to/from the software applications 5400 (also referred to as a computational unit, e.g. an audio echo cancellation or mechanism). The clock drift compensation unit 5300 provides a high frequency clock signal from a common HF clock 5301 to the software application 5400, such that the software application is synchronized to the common HF clock 5301.

The frequency of the common clock should in this context be understood as high with respect to the nature of analog signal captured by the capture unit and the analog signal output by the playout unit. A clock frequency in the range of approx. 1 MHz to 1 GHz may e.g. be used, recognizing that the sample rate of an audio signal is just a fraction of these rates.

The clock drift compensator 5300 requests position information from the playout FIFO 5110 read pointer and common HF clock 5301, as well as from the capture FIFO 5210 write pointer and the common HF clock 5301. The clock drift compensator 5300 uses the position and clock information to calculate a first relationship between the common HF clock 5301 and the playout sample number or the playout read pointer, and likewise a second relationship between the common HF clock 5301 and the capture sample number or the capture write pointer. Based on these calculated relationships, for each sample in the common clock domain, the corresponding samples may be found in the capture FIFO, and thus creating an input signal to the software application 5400 in common clock sampling frequency. Likewise, for each sample in the playout domain, the corresponding samples are found in the samples from the software application, ensuring that the correct number of samples is sent to the playout FIFO.

In the following, the clock drift compensator will be described in more detail. When ring buffers are used as buffers (e.g., queue buffers, FIFO buffers), pointers will wrap (i.e., wrap around from one end of the buffer to the opposite end). When referring to pointers below, an wrapped pointer is described.

In reference to FIG. 5, the playout time device or playout time estimator 5311 reads multiple sets of data, wherein each set is a sample/readout of the common high frequency clock 5301 and of the playout read pointer 5113. Based on many such sets of data, the relation between the playout read pointer and the high frequency clock is estimated. The playout read pointer 5111 is used as a representation of the DAC conversion clock 5102. For each sample time in the DAC time domain, the software application's 5400 corresponding time (measured by the application reference clock, the common HF clock 5301) is able to be calculated. Thus, the correct sample value for each sample in the playout domain (DAC) can be calculated by using a nearest application domain sample and a subsample delay filter by the playout time correcting block 5312. Finally, this sample is written to the playout ring buffer 5112. It should be noted, in the case where the DAC conversion clock drifts compared to the application (common) clock 5301, the number of samples generated on the output of the time corrector 5312 will differ marginally from the number of samples consummated by the time corrector 5312, i.e. it will work as a sample rate converter.

Likewise, the capture time device, or capture time estimator, 5321 reads multiple sets of data, wherein each set is a sample/readout of the common high frequency clock 5301 and of the capture write pointer 5213. Based on many sets of data, the relation between the capture write pointer and the high frequency clock is estimated. The capture write pointer is used as a representation of the ADC conversion clock 5202. For each sample time in the application's 5400 time domain (measured by the application reference clock, the common HF clock 5301), the ADC corresponding time can be calculated. Thus the application's correct sample value can be calculated by the capture time correcting block 5322 by using the nearest ADC domain samples and known interpolation methods (e.g., SINC function weighting between adjacent sample sets to produce new sample(s)). It should be noted, in the case where the application's (common) clock 5301 drifts compared to ADC clock 5202, the number of samples generated on the output of the capture time corrector 5321 will differ marginally from the number of samples consumed at the input of the capture time corrector 5321, i.e. it will work as a sample rate converter. Likewise, the sample rate converter can also perform a decimation function to reduce sample rate as part of a compensation function. The decimation rate is adjustable based on the amount of conversion needed to offset the observed drift.

For the compensation between the ADC and DAC only, the drift compensator 5300 as shown in FIG. 5 can be simplified in two ways.

Figure 6:
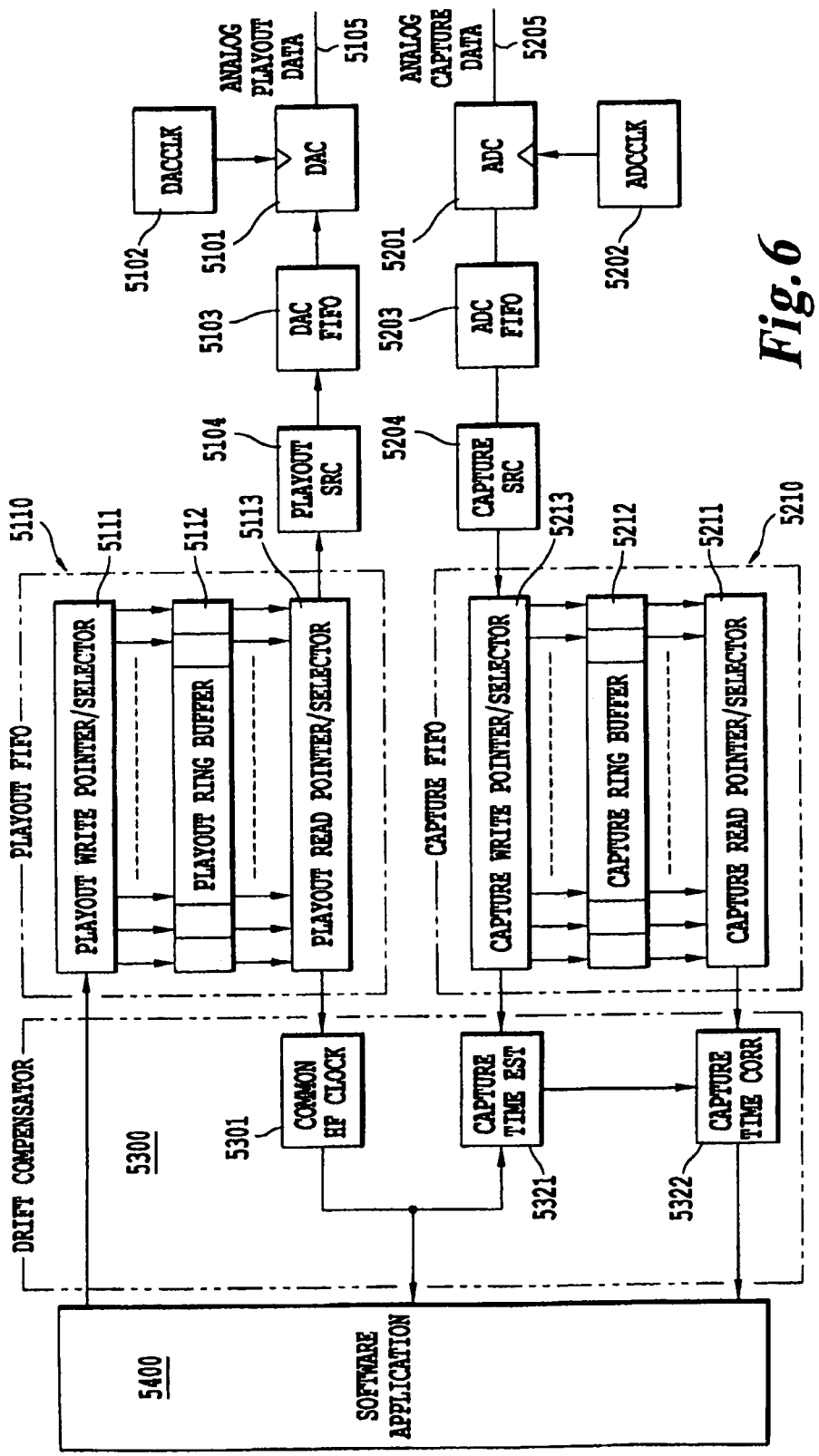
FIG. 6 illustrates a clock drift compensator according to an alternative embodiment of the present invention.

According to one exemplary embodiment of the present invention the software application is synchronized to the DACCLK 5102. In this case, the playout read pointer 5113 acts as common clock, and the capture time device and clock corrector uses this clock as the common clock 5301, as illustrated in FIG. 6. Since the playout system 5100 and software application 5400 are synchronous, the playout time device and time corrector may operate in a simplified manner, but still consistent with the principles of the invention. In this embodiment, the first relationship may be set rather than calculated, while the second relationship is calculated.

According a second exemplary embodiment, the application is synchronized to the ADCCLK 5202. In this embodiment, the capture write pointer 5213 acts as common clock, and the playout time estimator 5311 and playout clock corrector 5312 uses this clock as the common clock 5301. Since the ADC and application is synchronous, the capture time device and time corrector may operate in a simplified or even trivial manner, but they are still consistent with the principles of the invention. In this embodiment the second relationship may be set rather than calculated, while the first relationship is calculated.

However, in many cases, synchronizing to one trusted clock source is advantageous. First of all, the common clock should be of high resolution (as explained later, the playout or capture pointers are not necessarily high resolution). Secondly, the software application 5400 should use a clock which is as synchronous with real world clock as possible. The latter is important when a communication system communicates with another system, or when a measurement system refers to a measurement in real world time.

Therefore, according to one embodiment of the present invention, a stable and trusted clock source (not being DAC-CLK or ADCCLK) is selected as the common HF clock 5301. This common clock also acts as the software applications 5400 reference clock. For example, the common HF clock 5301 could be the PC's system clock. In this embodiment the first and second relationships are both calculated.

Figure 7:
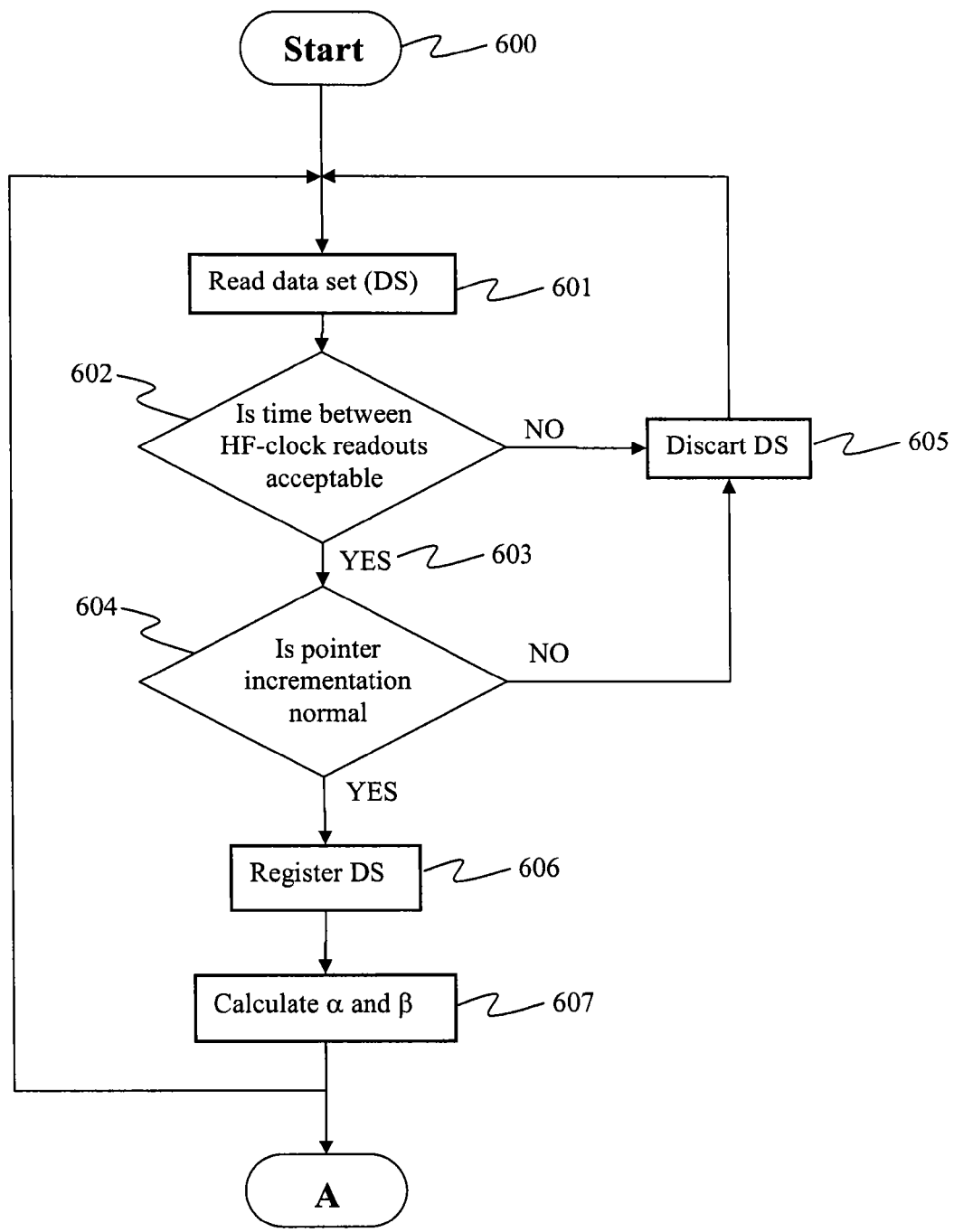
FIG. 7 is a flow diagram for compensating for different sampling rates between a playout system and a capture system.
Figure 8:
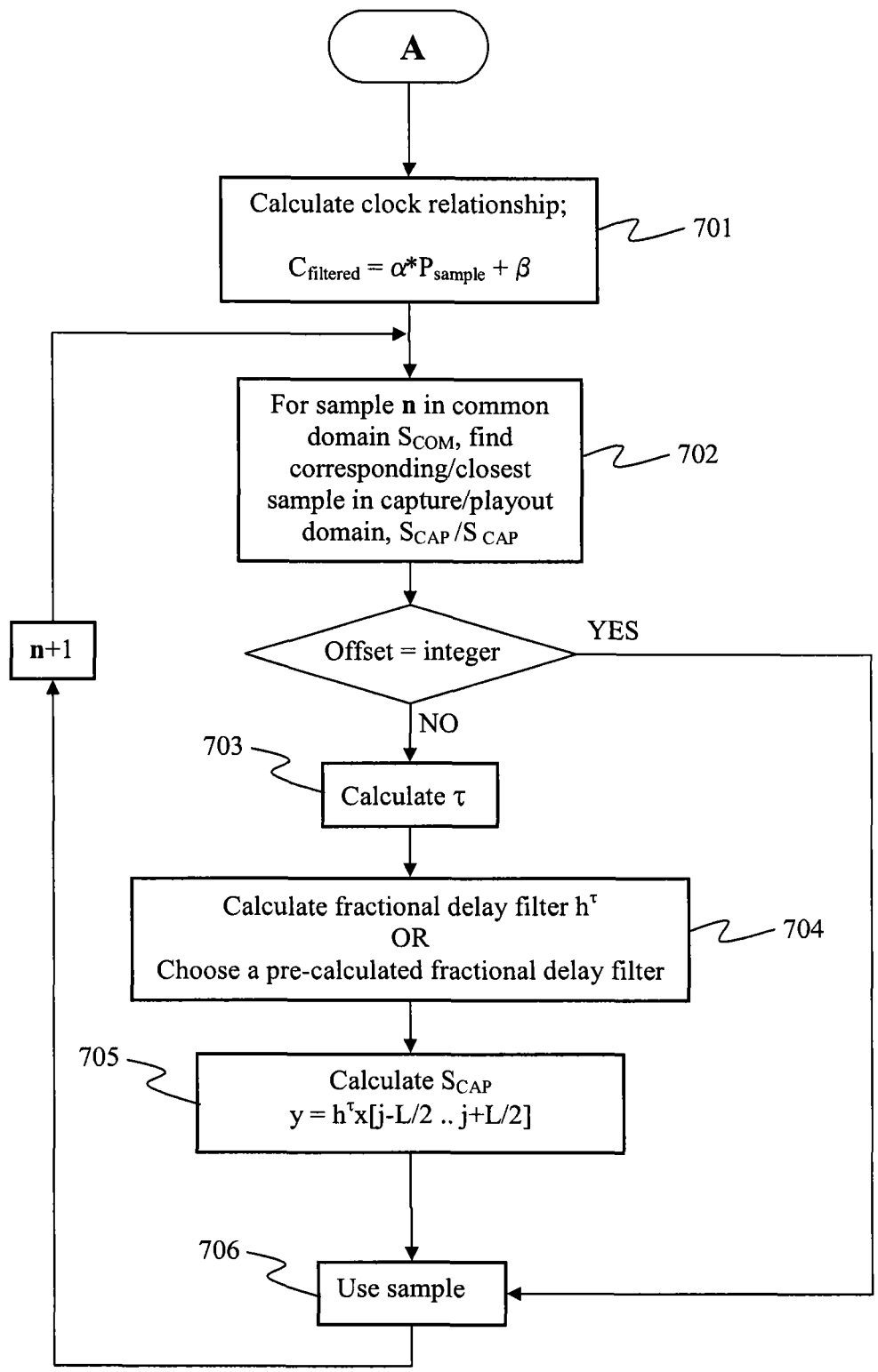
FIG. 8 is another flow diagram that completes the process described in FIG. 7.

FIGS. 7 and 8 show a flow chart representation of an overview of the operation of the clock drift compensator, in accordance with one embodiment of the present invention (reference is also made to FIG. 5 in the following discussion). Each of the blocks in FIGS. 7 and 8 represent processes which are further described in the following discussion.

Operation begins in step 600 when the software application 5400 starts and initiates sending and requesting data to/from the playout/capture system 5110/5210 respectively. According to one exemplary embodiment of the invention, software application 5400 is an audio echo canceller (AEC) receiving a digital audio signal from a far side (not shown), via a communication network (such as the Internet, or a local network, or a hybrid), and playing it out on a speaker via a playout system (including components 5300, 5110, 5104, 5103, 5102, and 5101). Sound from the near end is captured and digitalized by a capture system (including components 5300, 5210, 5202, 5203, 5202, and 5201). As described in the background section, the AEC calculates an echo free audio signal and sends it back to the far side (not shown) via a communication network.

As recognized by the present inventors, when implemented in a personal computer for example, there are some factors complicating the above described compensation scheme.

When the playout/capture time estimator 5311/5321 reads a data set (step 601), the common HF clock 5301 and the playout/capture FIFO pointer 5113/5213 can not be acquired totally simultaneously. One of them will always have to be read first, and the other subsequently. Of course, as the first clock in the data set is read the second clock continues running. As long as the time between the readings is constant, this does not create any problems. However, computer hardware and applications often demand various interrupts etc., which in turn would result in variable times between readings. In some cases, by disabling interrupts, the time estimator 5311/5321 can ensure that the time variance between the two readings in each set is insignificant, or at least small enough to make it possible to remove the time uncertainty by filtering (situation 1a). However, some applications do not have the authority to disable interrupts, leading to significant time variance between the readouts.

Since some application do not have the authority to disable interrupts, the method and device according to the present embodiment checks each data set according to certain criteria and removes the data sets not complying with the criteria. As illustrated in step 602, for each data set, the HF clock 5301 readout is checked to determine if it is acceptable. This may be done by first reading the common HF clock 5301, thereafter the FIFO pointer 5113/5213 followed by another reading of the common HF clock 5301. Now, each set of data contains three data points instead of two (triplet). By analyzing many sets of data, a distribution of the time between two common HF clock 5301 readouts can be calculated. If the time between the two common HF clock 5301 readouts in a data set (triplet) is abnormal (too long according to the distribution, such as greater than two or more clock periods), it is assumed that something unusual (e.g. an interrupt) has occurred, making the data set uncertain. Such uncertain data sets are disqualified (step 605), leaving only data sets with low uncertainty for further calculations (step 603).

Another problem, as described above, is that the FIFO pointer may be updated in rather large steps. In other words, the FIFO buffers 5110/5210 may not always write/read one and one sample at a time, but rather read/write chunks of data periodically, e.g. 128 samples at a time or 16 samples at a time. Therefore, consecutive readouts of the playout/capture pointer 5113/5213 may give the same result, or two consecutive reads may also differ by a large value. This is illustrated by an example in FIG. 9.

Figure 9:
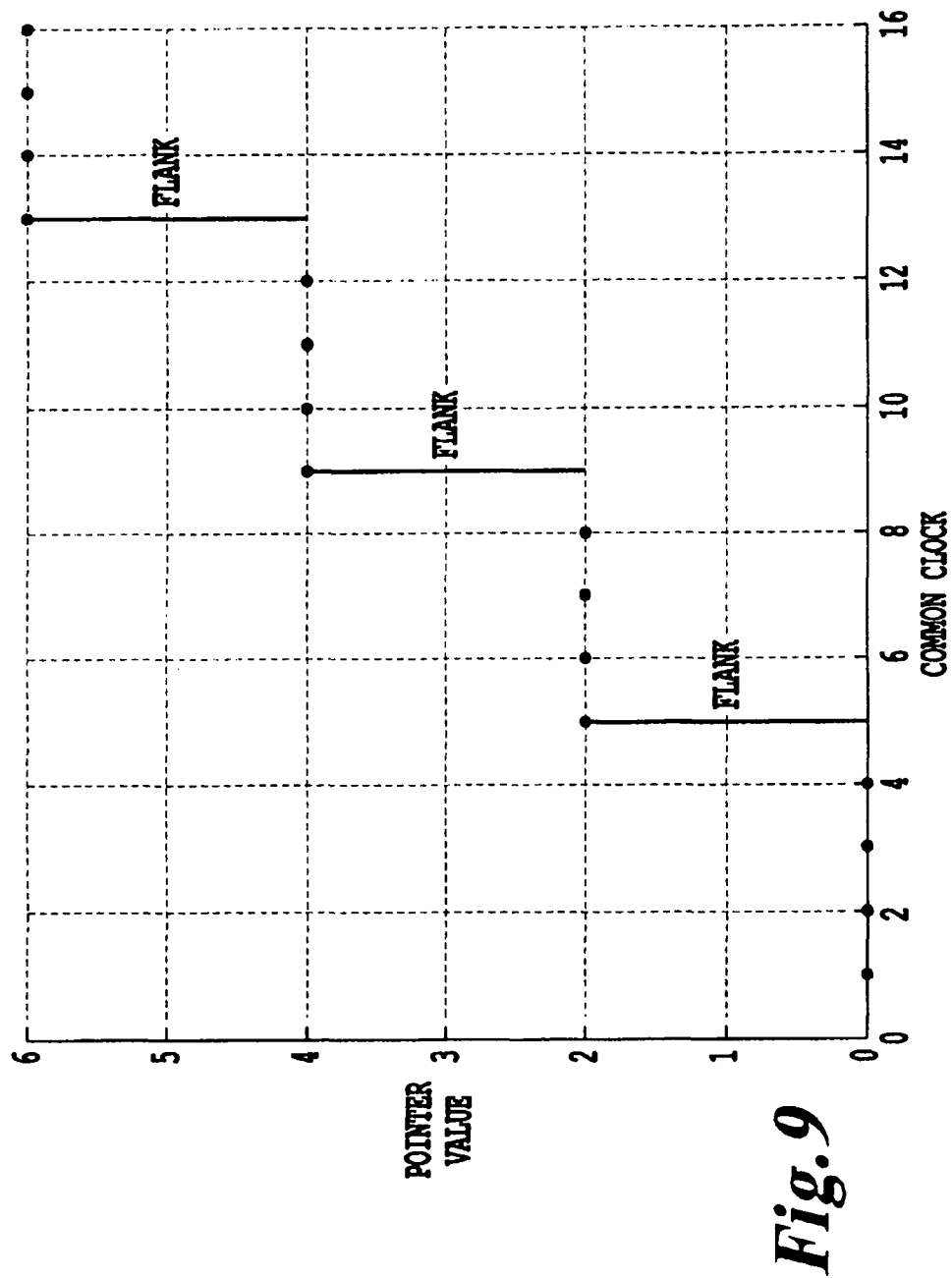
FIG. 9 is a graph that illustrates a typical pointer update scheme.

In the example of FIG. 9, the read sets of data would be; (0;0), (1;0), (2;0), (3;0), (4;0), (5;2), (6;2), (7;2), (8;2), (9;4), (10;4), etc. This acts as a quantization of the actual conversion clock, and might cause problems if not treated correctly. Read directly, this quantization introduces quantization noise, but unlike "regular" quantization noise, this noise cannot be assumed to be a white/random process; it is very regular and correlated to the clock. The noise manifests as a triangular signal pattern, which may give rise to alias problems and similar issues when under sampled (due to CPU complexity, data sets should not be read too frequently).

One way the present inventors solved this problem was by reading the FIFO pointer 5113/5213 when the pointer updates. This saves precious CPU resources, since the CPU can be freed during intervals between updates. Typically, the software application 5400 must ensure/request run time just before an expected update of the pointer (e.g. using a time interrupt). The expected update time may be found by analyzing the update procedure of the FIFO in an initial phase. For example, if the FIFO typically updates with blocks of 128 samples, and the conversion clock 5102/5202 has a frequency of 48 kHz, the drift compensator 5300 can stop reading the FIFO pointer (5113 and/or 5213) for approx N*128/48000 seconds (where N is any positive integer number, chosen as a compromise between CPU complexity and accuracy) after an update before it resumes reading new data sets. Just before an expected update, the drift compensator 5300 reads triples until the pointer updates between two consecutive common HF clock readouts. In practice, this is implemented by reading common HF clock 5301, then FIFO pointer 5113/5213, HF clock, FIFO pointer and so on until the pointer has been updated, e.g. C-1, P-1, C-2, P-2, C-3, P-3, C-4, etc. where C- denotes read of clock and P- denotes read of pointer. If the FIFO pointer 5113/5213 updates from P-1 to P-2, the common HF clock 5301 being registered is C-2, or some average (or weighting) of C-1, C-2 and C-3. The pointer being registered is typically (but other variants are applicable) the average of P-1 and P-2. To comply with the previous criteria the time between C-1 and C-3 must not be abnormal high, or else the date set would be discarded (step 605). From a CPU load point of view, it would be best to test for a transition in the pointers while reading them. However, to reduce time uncertainty, i.e. ensure as low time as possible from (in this case) C-1 to C-3, it may be advantageous to log the sequence for a given time (until expected transition of pointer+a margin), and locate the transition afterwards.

Yet another problem needs to be addressed in order to ensure that further calculations are not influenced by incorrect or uncertain data sets. Due to deficiencies in personal computers, strange and unexpected behaviors of the FIFO pointers are experienced; unexpected update steps, pointers going backwards, etc. This behavior may be caused by the audio card drivers trying to compensate for drift, queuing problems (out of order execution of requests), etc. Therefore, as illustrated in step 604, for each data set not discarded in step 602, another check is performed. As mentioned above, data is analyzed over time and statistics are also kept over normal pointer increments. If the pointer is updated by an abnormal value, that data set is discarded (step 605). For example, if a pointer is consecutively updated with 128 samples over a period of time, an update deviating considerable from 128 samples is considered as an uncertain dataset, and hence discarded. However, due to the sample rate converter 5104/5204, a deviation with one sample (i.e. an update of either 127 or 129) must be considered as a valid update.

Over time, multiple pairs of C and P data will be approved in both step 602 and step 604, and are then registered (step 606). This data is processed with an algorithm forgiving all disqualified pairs, meaning it must not require uniform sampling. Further, from the noisy (noise from situation 1a) set of pairs, it must estimate the relationship between the common HF clock 5301 (denoted by C) and the pointer 5113/5213 (denoted by P) with adequate accuracy. Therefore, according to one embodiment of the present invention, the relationships between the common clock and the capture pointer, and between the common clock and playout pointer, are calculated based on statistical models. In the following some suitable linear regression methods are introduced. However, other statistical models may be used within the scope of the invention.

The actual clock (measured by the common HF clock 5301) of one sample may be calculated by:

$$C_{filtered} = \alpha * P_{sample} + \beta \quad [1]$$

The factor $\alpha$ is the rate relationship between the common HF clock 5301 and the pointer 5113/5213, and will have a value of nominal HF clock frequency divided by the pointer update rate plus/minus a smaller value defining the clock drift constant. The factor $\beta$ is just an offset, eliminating the normal case where C and P do not start at zero at the same time.

Therefore, in step 607, the factors $\alpha$ and $\beta$ are calculated. According to one exemplary embodiment of the invention the least mean square algorithm is used as a filtering algorithm:

$$S_P = \Sigma P_i \quad [2]$$

$$S_C = \Sigma C_i \quad [3]$$

$$S_{PP} = \Sigma P_i^2 \quad [4]$$

$$S_{PC} = \Sigma P_i * C_i \quad [5]$$

M=number of data sets in calculation,
i denotes the set of data sets to calculate the sums over $$\alpha = (M*S_{PC} - S_P*S_C)/(M*S_{PP} - S_P^2) \quad [6]$$

$$\beta = (S_C*S_{PP} - S_P*S_C)/(M*S_{PP} - S_P^2) \quad [7]$$

The accuracy of $C_{filtered}$ improves with higher number of data pairs (M). However, over time, the drift offset may change, invalidating the linear relationship between $P_{sample}$ and $C_{filtered}$ (a changes). Therefore, the time between the first and last data sets in the calculation must be selected as a compromise between accuracy (requires long time) and ability to track changing drift factor (requires that the linear relationship is a good approximation, therefore a limitation of time). A higher order model could be used, simplifying this compromise, but in practice, the drift factor varies slowly enough to make a suitable compromise using a linear/first order model.

The necessity of keeping track of changing drift factor means that the oldest sets of clock/pointer data must be left out of the calculation as new data sets are retrieved, i.e. the sums above will be calculated as a sliding window. It is not necessary to calculate the sum directly for each new pair of data. To save CPU cycles, an update of the new and oldest data sets is sufficient:

$$S_{P,m} = S_{P,m-1} + P_m - P_{m-M} \quad [8]$$

$$S_{C,m} = S_{C,m-1} + C_m - C_{m-M} \quad [9]$$

$$S_{PP,m} = S_{PP,m-1} + P_m^2 - P_{m-M}^2 \quad [10]$$

$$S_{PC,m} = S_{PC,m-1} + P_m * C_m - P_{m-M} * C_{m-M} \quad [11]$$

M=number of data sets in calculation,
m denotes most recent pair index $$\alpha = (M*S_{PC,m} - S_{P,m}*S_{C,m})/(M*S_{PP,m} - S_{P,m}^2) \quad [12]$$

$$\beta = (S_{C,m}*S_{PP,m} - S_{P,m}*S_{C,m})/(M*S_{PP,m} - S_{P,m}^2) \quad [13]$$

Although the above equations are theoretically correct, error build up due to limited precision/rounding may cause problems. Therefore, according to another exemplary embodiment of the present invention, a loss factor ($\delta$) is added to the calculation:

$$S_{P,m}=\delta*S_{P,m-1}+P_m-\delta^M*P_{m-M} \quad [14]$$

$$S_{C,m}=\delta*S_{C,m-1}+C_m-\delta^M*C_{m-M} \quad [15]$$

$$S_{PP,m}=\delta*S_{PP,m-1}+P_m^2-\delta^M*P_{m-M}^2 \quad [16]$$

$$S_{PC,m}=\delta*S_{PC,m-1}+P_m*C_m-\delta^M*P_{m-M}*C_{m-M} \quad [17]$$

$$S_M=\Sigma\delta^i, i=0\ldots(M-1) \quad [18]$$

$$\alpha=(S_M*S_{PC,m}-S_{P,m}*S_{C,m})/(S_M*S_{PP,m}-S_{P,m}^2) \quad [19]$$

$$\beta=(S_{C,m}*S_{PP,m}-S_{P,m}*S_{C,m})/(S_M*S_{PP,m}-S_{P,m}^2) \quad [20]$$

$S_M$ is constant and thus only needs to be calculated once.

The loss factor $\delta$ is typically selected a little smaller than unity (e.g., 0.95, 0.9, 0.85, etc.). This factor will reduce the influence of older data (which is not intentional/necessary, but will not cause any problems either), and it will also introduce a forgetting factor for round off errors.

The adding of a loss factor $\delta$ makes it possible with one further simplification. By selecting M as infinity, $\delta^M$ approaches 0, and therefore the subtractions in the sliding sums [14]-[17] can be omitted, and no data has to be stored in delay lines for the summing purposes. The drawback is an even harder compromise between proper filtering and the ability to track changing drift factor. All data pairs will "live forever" but tracking the drift factor may in many cases be possible since older data pairs (by proper selection of the loss factor $\delta$) may have an insignificant weight in the calculations.

The correct time $C_{filtered}$ (with respect to the common HF clock 5301) of any sample/pointer can be calculated based on the estimated $\alpha$, $\beta$ and equation [1], $C_{filtered}=\alpha*P_{sample}+\beta$, step 701.

The task of the playout time corrector 5312 and the capture time corrector 5321 is to calculate correct sample values in one time domain based on the known samples in another time domain, knowing the time offset/skew between the different domains.

In the following, a description is provided on how to capture domain samples converted to common domain samples according to one embodiment of the present invention. However, the conversion from common domain to playout domain is similar.

Based on the calculated clock relationship (step 701), for each sample in common domain, the capture sample time corrector 5321 finds the corresponding samples in the capture domain. The term corresponding sample is to be interpreted as, for each sample time in the common domain the sample value in the capture domain for that time is found, either by copying a sample value directly if a sample at that time exists or by calculating the sample value at that time using some sort of interpolation technique. So, for each sample in common domain, the capture sample time corrector 5321 finds the sample (index j) in the capture domain which is closest in time to the sample in common domain (step 702). If the offset (time skew) between the domains is an integer, sample j can be copied and used directly (step 706). However, the offsets (time skews) are usually not integers. Therefore, a fractional value $\tau$, hereafter referred to as residual factor $\tau$, is calculated (step 703). The residual factor, $\tau$, is the remainder after subtracting the integer offset/skew value, and defines the sub-sample delay, and should be between approximately −0.5 and 0.5. It should be noted that values marginally outside the [−0.5, 0.5] range may occur, due to the drift in sampling frequencies.

Delaying a signal with a sub-sample delay may be performed using an all-pass filter with a constant time delay. A sinc pulse with an offset has these properties. A sinc pulse, however, is by definition infinite in length, and in practical implementations a window must be applied. The window's characteristics and length must be chosen to ensure that the frequency response (both magnitude and delay) has adequate accuracy in all frequencies of interest. For example, if the echo canceller works with a sampling rate of 16 kHz, audio signals up to 7 kHz are normally present. In this case, the magnitude and delay of the frequency response must be flat up to 7 kHz, whereas the magnitude and phase may deviate from the ideal response above 7 kHz, since there are no signals in this band. One window type found to have very good characteristics for this purpose is the Blackman window.

Thus, a sub-sample time delay filter ($h^\tau$) of length L+1 is calculated:

$$h^\tau=\text{sinc}((-L/2\ldots L/2)-\tau)*\text{window}(\text{length } L+1) \quad [21]$$

When selecting L=48, Blackman window, sampling frequency of 16 kHz, and frequencies of interests up to 7 kHz, the time delay error of this filter is less than 0.005 samples, and the amplitude error is less than 0.005 dB; such small errors will not cause noticeable degradations of echo canceller performance.

Finally, in step 705, the sample y (in other words sample value at j±τ) in the common clock domain is calculated as the convolution of the time delay filter ($h^\tau$) and a series of samples from the capture domain:

$$y=h^\tau x[j-L/2\ldots j+L/2] \quad [22]$$

Here x is the time series of samples from the capture time domain. The vector of samples used in the calculation is centered around the sample closest in time, defined by j, whereas remaining sub sample delay is defined by the all-pass filter $h^\tau$.

In the case of drifting, the residual factor $\tau$ will change for each sample, and hence a new filter $h^\tau$ is necessary for each sample. Calculating a new filter for each sample may be too computationally exhaustive. Although proper selection of data sets and proper filtering is secured, there will always be some residual noise on the time delay. Therefore, without noticeable degradation, it is possible to define a (e.g. uniformly distributed) discrete set of delays and corresponding set of precalculated filters. During processing the precalculated filter with the smallest error compared to the actual delay is selected. The effect of this is the same as a quantization of $\tau$. It should be noted that, since the sub-sample delay may exceed the [−0.5, 0.5] range, there should be some precalculated filters dealing with these "exceeding" delays as well.

This time correction algorithm will for consecutive common clock domain samples act as a resampler from the capture domain to the common domain. If there are any drift in frequency, the estimated times will drift correspondingly, and therefore the rate (and number of samples) will be changed slightly from the capture domain to the common clock domain, as intended. It should be pointed out that, using an all-pass filter as the filter in a rate conversion algorithm, according to one embodiment of the invention, has some theoretically "scruples", e.g. the SINC width should ideally be adapted to the sample conversion rate. However, for practical purposes these theoretical aspects are insignificant, since the conversion rate is always very close to unity.

The same type of correction as discussed above is performed on the playout side. Hence, the software application (e.g. the echo canceller algorithm implemented in the computational unit) sees the same sample frequency (time base)

on all signals sent and received. Therefore, no modification of e.g. standard echo canceling algorithms are required to make it work on systems with non-synchronous ADC and DAC conversion rates.

In PCs, glitches in audio capture or playout are frequently present. These may be big glitches caused by complete lost frames of audio data or loss of a single sample. The reason may be CPU overload or similar. It is out of scope of this invention to define methods for detecting and adjusting for such glitches. However, using the described approach, timing calculation is possible with an accuracy of a small fraction of a sample (and eventual glitch) is possible, simplifying such detection and correction.

The method and drift compensator according to the present invention have several advantages. Any drift or other differences in timing is efficiently detected with high accuracy, making the software application 5400, e.g. echo canceller or other computational units, work properly. Due to the high accuracy, other infirmities like glitches can be easily detected and compensated for.

Since there are no resetting algorithms, any change of situation will be automatically detected and compensated for by the algorithm. There will be no error or offset build ups; the path from the application 5400 output (e.g. echo canceller loudspeaker signal 2102/3102) to the applications input (e.g. the echo canceller microphone input 2106/3106) through the playout and capture systems and software layers are always constant.

The complete system is clocked/synchronized to a trusted and well known clock source and not relying on any vendor of ADC or DAC subsystem.

The clock drift compensator 5300 is a completely separate module, which means that it can be used with standard applications without any need for adjusting these applications. For example, an echo canceller developed for embedded products with synchronous ADC and DAC can be used in a PC, with drift issues as discussed, without further modifications.

The clock drift compensator 5300 according to the present invention is applicable for any type of application requiring a known/fixed relationship between DAC and ADC.

The clock drift compensator may be used for acoustic echo cancelling in a teleconferencing system, such as a telephone conferencing system or a videoconferencing system. One exemplary platform is a personal computer, having a processor-based system like that described in co-pending U.S. application Ser. No. 11/966,773, filed in the US on Dec. 28, 2007, the entire contents of which being incorporated herein by reference. A particular example is an Intel Mobile Core 2 Quad laptop or desktop computer, which may or may not be running TANDBERG's MOVI software and connected to a TANDBERG MOVI server. Likewise, teleconference endpoints, such as H.323 endpoints, or even conference room systems such as the MXP product line (e.g., MXP 8000) available from TANDBERG could host the acoustic echo cancelling system. The PC includes an audio board such as a SOUND BLASTER X-Fi by CREATIVE.

In particular, the clock drift compensator may be incorporated in a teleconferencing terminal, such as a telephone conferencing terminal or a videoconferencing terminal, for obtaining acoustic echo cancelling in a teleconferencing system wherein such teleconference terminals intercommunicate via a communication network.

Such a teleconferencing terminal may further include a computational unit such as a regular personal computer executing an operating system and software applications, a D/A converter configured to read digital data from the playout FIFO buffer comprised by the playout unit included in the clock drift compensator, an audio amplifier configured to amplify the analog signal provided by the D/A converter, an audio loudspeaker connected to the output of the audio amplifier, a microphone, a microphone amplifier connected to the microphone, an A/D converter arranged for converting the microphone amplifier output signal to digital form and providing the digital signal to the capture FIFO buffer comprised by the capture unit included in the clock drift compensator. The computational unit may be operatively connected to a communication network such as a local area network and/or the Internet, thus enabling a teleconference system over the network. The teleconferencing terminal may additionally include a camera, a display and further structural and functional features for enabling video conferencing.

The invention claimed is:

1. A computer implemented audio signal processing method that compensates for different sampling rates between a playout unit and a capture unit, the method comprising:

receiving samples of an audio signal at the playout unit from a computational unit, the playout unit consuming samples in a playout time domain that operates according to a playout clock;

sending samples to the computational unit from the capture unit, the capture unit producing samples in a capture time domain that operates according to a capture clock;

synchronizing the computational unit to a common clock operating in a common clock time domain, said common clock being different than said playout clock and the capture clock;

establishing with a processor a first relationship between the common clock and a playout read pointer associated with the playout buffer;

establishing with the processor a second relationship between the common clock and a capture write pointer associated with the capture buffer;

for each sample in the playout time domain, obtaining a corresponding sample from the samples from the computational unit, based on the first relationship, and sending the corresponding sample to the playout buffer; and for each sample in the common clock time domain, obtaining a corresponding sample in the capture time domain, based on the second relationship, and sending the corresponding sample to the computational unit, wherein the obtaining the corresponding sample in the capture time domain includes identifying a sample in the capture time domain closest in time to a sample in the common clock time domain;

if an offset between the common clock time domain and the capture time domain is not an integer, calculating a subsample and providing the subsample as the found sample, said calculating including calculating a residual factor $\tau$, the residual factor being a residual after subtracting an integer offset between the common clock time domain and the capture time domain, and convolving a time delay filter ($h^\tau$) of length L+1 with a series of samples (y) from the capture time domain according to $$y = h^\tau x[j-L/2 \ldots j+L/2],$$

where x is a time series of samples from the capture time domain, and the vector of samples used in the calculation is centered around the sample closest in time defined by (j).

2. The method according to claim 1, wherein
the establishing includes setting the first relationship and calculating the second relationship.
3. The method according to claim 1, wherein
the establishing includes calculating the first relationship and setting the second relationship.
4. The method according to claim 1, wherein
the establishing includes calculating the first relationship and the second relationship.
5. The method according to claim 1, wherein
the computational unit is an audio echo canceller.
6. The method according to claim 1, wherein
the establishing includes calculating at least one of the first relationship and the second relationship using a statistical model.
7. The method according to claim 6, wherein
the statistical model includes a linear regression method that performs at least one of a least mean square process, and a least mean square process with a loss factor for reducing round off errors.
8. The method according to claim 1, wherein
the common clock includes at least one of a clock signal associated with the read pointer, a clock signal associated with the capture pointer, and a clock signal associated with the processor, the processor being an operational part of the computational unit.
9. The method according to claim 1, wherein the calculating a subsample further comprises:
pre-calculating a set of time delay filters ($h^\tau$) for a discrete number of residual factors ($\tau$); and
selecting one of the pre-calculated filters ($h^\tau$), where the selected filter represents the filter closest to the calculated residual factor $\tau$.
10. The method according to claim 1, wherein the calculating a subsample comprises:
calculating the time delay filter ($h^\tau$) for each sample.
11. The method according to claim 1, wherein,
the first relationship and the second relationship are based on readouts of common clock, playout read pointer and capture write pointer data, and
establishing the first relationship and establishing the second relationship each comprise weighting new data more than old data.
12. The method according to claim 1, wherein the establishing the first relationship further comprises:
reading a set of first data, wherein the set of the first data comprises substantially simultaneous reading out at least the common clock and the playout read pointer; and
registering the set of first data if complying with a set of predefined criteria.
13. The method according to claim 1, wherein the establishing the second relationship further comprises:
reading a set of second data, wherein the set of the second data comprises substantially simultaneous reading out at least the common clock and the capture write pointer; and
registering sets of the first data and the second data if complying with a set of predefined criteria.
14. The method according to claim 12, wherein the predefined criteria is complied with if at least one of two following conditions occurs:
a time between consecutive common clock readouts around the time of a data set does not exceed a predefined threshold; and
a pointer increment is not abnormal.

15. The method according to claim 13, wherein the predefined criteria is complied with if at least one of two following conditions occurs:
a time between consecutive common clock readouts around the time of a data set does not exceed a predefined threshold; and
a pointer increment is not abnormal.
16. A clock drift compensation unit that compensates for different sampling rates between a playout unit and a capture unit, the clock drift compensation unit comprising:
a common clock, operating in a common clock time domain, providing a clock signal to a computational unit, the computational unit is configured to send samples to the playout unit and receive samples from the capture unit, the playout unit operates in a playout time domain that operates according to a playout clock and includes at least a playout buffer, and the capture unit operates in a capture time domain that operates according to a capture clock and includes a capture buffer, said common clock being different than the playout clock and said capture clock;
a playout time device configured to establish a first relationship between the common clock and a playout read pointer associated with the playout buffer;
a capture time device configured to establish a second relationship between the common clock and a capture write pointer associated with the playout buffer;
a playout time corrector configured to, for each sample in the playout time domain, obtain a corresponding sample in the samples from the computational unit, based on the first relationship, and sending the corresponding sample to the playout buffer; and
a capture time corrector configured to, for each sample in the common clock time domain, obtain a corresponding sample in the capture time domain, based on the second relationship, and send the corresponding sample to the computational unit, wherein,
the capture time corrector is further configured to identify a sample in the capture time domain closest in time to a sample in the common clock time domain, wherein
if an offset between the common clock time domain and the capture time domain is not an integer, calculate a subsample and provide the subsample as the found sample, and
the capture time corrector is further configured to
calculate a residual factor $\tau$, the residual factor being a residual after subtracting an integer offset between the common clock time domain and the capture time domain; and
convolve a time delay filter ($h^\tau$) of length $L+1$ with a series of samples (y) from the capture time domain according to $$y=h^\tau x[j-L/2 \ldots j+L/2],$$

where $x[j-L/2 \ldots j+L/2]$ is a time series of samples from the capture time domain centered around the sample closest in time (j).
17. The clock drift compensation unit according to claim 16, wherein
the first relationship is set and the second relationship is calculated with a processor.
18. The clock drift compensation unit according to claim 16, wherein
the first relationship is calculated with a processor and the second relationship is set.
19. The clock drift compensation unit according to claim 16, wherein the first relationship and the second relationship are calculated with a processor.

20. The clock drift compensation unit according to claim 16, wherein
the computational unit is an audio echo canceller.

21. The clock drift compensation unit according to claim 16, wherein at least one of:
the playout time device uses a statistical model to calculate the first relationship; and
the capture time device uses a statistical model to calculate the second relationship.

22. The clock drift compensation unit according to claim 21, wherein the statistical model employs linear regression that uses at least one of:
a least mean square process; and
a least mean square process with a loss factor for reducing round off errors.

23. The clock drift compensation unit according to claim 16, wherein the common clock includes at least one of:
a clock signal associated with the read pointer;
a clock signal associated with the capture pointer; and
a clock signal associated with a processor used with the computational unit.

24. The clock drift compensation unit according to claim 16, wherein,
the capture time corrector is further configured to:
pre-calculate a set of time delay filters ($h^\tau$) for a discrete number of residual factors ($\tau$); and
select one of the pre-calculated filters ($h^\tau$), where the selected filter represents a filter closest to the calculated residual factor $\tau$.

25. The clock drift compensation unit according to claim 16, wherein,
the first relationship and the second relationship are based on readouts of common clock, playout read pointer and capture write pointer data, and
the playout time device or the capture time device are configured to weight new data more than old data when establishing the first relationship or the second relationship.

26. The clock drift compensation unit according to claim 20, wherein,
the playout time corrector is further configured to,
identify a sample in the samples from the computational unit closest in time to a sample in the playout time domain; and
if an offset between the playout time domain and common clock time domain is not an integer, calculate a subsample (y) and provide the subsample as the found sample.

27. The clock drift compensation unit according to claim 16, wherein,
the capture time corrector and the playout time corrector are further configured to:
pre-calculate a set of time delay filters ($h^\tau$) for a discrete number of residual factors ($\tau$); and
select one of the pre-calculated filters ($h^\tau$), where the selected filter represents the filter closest to the calculated residual factor $\tau$.

28. The clock drift compensation unit according to claim 16, wherein,
the capture time corrector is further configured to calculate the time delay filter ($h^\tau$) for each sample.

29. The clock drift compensation unit according to claim 16, wherein,
the playout time device is further configured to:
read a set of first data, wherein the set of first data comprises at least substantially simultaneous readouts of the common clock and the playout read pointer; and
register the set of first data if complying with a set of predefined criteria.

30. The clock drift compensation unit according to claim 16, wherein,
the capture time device is further configured to:
read a set of second data, wherein the set of second data comprises at least substantially simultaneous readouts of the common clock and the capture write pointer; and
register the set of first data and the set of second data if complying with a set of predefined criteria.

31. The clock drift compensation unit according to claim 29, wherein the predefined criteria is complied with if:
a time between consecutive common clock readouts around a time that a data set does not exceed a predefined threshold, or
a pointer increment is not abnormal.

32. The clock drift compensation unit according to claim 30 wherein the predefined criteria is complied with if:
a time between consecutive common clock readouts around a time of a data set does not exceed a predefined threshold, or
a pointer increment is not abnormal.

33. A teleconferencing terminal, comprising:
a personal computer; and
a clock drift compensation unit for compensating for different sampling rates between a playout unit and a capture unit, the clock drift compensation unit including:
a common clock, operating in a common clock time domain, providing a clock signal to a computational unit, the computational unit is configured to send samples to the playout unit and receive samples from the capture unit, the playout unit operates in a playout time domain that operates according to a playout clock and includes at least a playout buffer, and the capture unit operates in a capture time domain that operates according to a capture clock and includes a capture buffer, said common clock being different than the playout clock and said capture clock;
a playout time device configured to establish a first relationship between the common clock and a playout read pointer associated with the playout buffer;
a capture time device configured to establish a second relationship between the common clock and a capture write pointer associated with the playout buffer;
a playout time corrector configured to, for each sample in the playout time domain, obtain a corresponding sample in the samples from the computational unit, based on the first relationship, and sending the corresponding sample to the playout buffer; and
a capture time corrector configured to, for each sample in the common clock time domain, obtain a corresponding sample in the capture time domain, based on the second relationship, and sending the corresponding sample to the computational unit, wherein,
the capture time corrector is further configured to identify a sample in the capture time domain closest in time to a sample in the common clock time domain, wherein
if an offset between the common clock time domain and the capture time domain is not an integer, calculate a subsample and provide the subsample as the found sample, and the capture time corrector is further configured to calculate a residual factor τ, the residual factor being a residual after subtracting an integer offset between the common clock time domain and the capture time domain; and convolve a time delay filter ($h^\tau$) of length L+1 with a series of samples (y) from the capture time domain according to $$y = h^\tau x[j-L/2 \ldots j+L/2],$$

where $x[j-L/2 \ldots j+L/2]$ is a time series of samples from the capture time domain centered round the sample closest in time (j).

34. The teleconferencing terminal of claim 33, further comprising:

an echo canceller that includes the clock drift compensation unit.

35. A non-transitory computer program product having instructions stored thereon that when executed by a processor perform a method to compensate for different sampling rates between a playout unit and a capture unit, the method comprising:

receiving samples of an audio signal at the playout unit from a computational unit, the playout unit consuming samples in a playout time domain that operates according to a playout clock;

sending samples at the computational unit from the capture unit, the capture unit providing samples in a capture time domain that operates according to a capture clock;

synchronizing the computational unit to a common clock operating in a common clock time domain, said common clock being different than said playout clock and the capture clock;

establishing with a processor a first relationship between the common clock and a playout read pointer associated with the playout buffer;

establishing with the processor a second relationship between the common clock and a capture write pointer associated with the capture buffer;

for each sample in the playout time domain, obtaining a corresponding sample from the samples from the computational unit, based on the first relationship, and sending the corresponding sample to the playout buffer; and for each sample in the common clock time domain, obtaining a corresponding sample in the capture time domain, based on the second relationship, and sending the corresponding sample to the computational unit, wherein the obtaining the corresponding sample in the capture time domain includes identifying a sample in the capture time domain closest in time to a sample in the common clock time domain;

if an offset between the common clock time domain and the capture time domain is not an integer, calculating a subsample and providing the subsample as the found sample, said calculating including calculating a residual factor τ, the residual factor being a residual after subtracting an integer offset between the common clock time domain and the capture time domain, and convolving a time delay filter ($h^\tau$) of length L+1 with a series of samples (y) from the capture time domain according to $$y = h^\tau x[j-L/2 \ldots j+L/2],$$

where x is a time series of samples from the capture time domain, and the vector of samples used in the calculation is centered around the sample closest in time defined by (j).

* * * * *